United States Patent [19]

Diamond et al.

[11] 4,120,860

[45] Oct. 17, 1978

[54] 3-ARYL-1-(2- OR 4-IMINODIHYDRO-1-PYRIDYL)-2-PROPANOL ANTIARRHYTHMIC COMPOUNDS

[75] Inventors: Julius Diamond; Ronald A. Wohl, both of Morris Plains, N.J.

[73] Assignee: Cooper Laboratories, Inc., Parsippany, N.J.

[21] Appl. No.: 795,530

[22] Filed: May 10, 1977

[51] Int. Cl.² .............................................. C07D 211/80
[52] U.S. Cl. .................................. 260/296 R; 424/258; 424/263; 260/288 R; 260/294.8 D; 260/294.8 E; 260/294.8 F; 260/294.9; 260/295 AM; 260/295 R; 260/297 B; 260/297 R

[58] Field of Search .................... 260/296 R, 294.8 D, 260/294.8 E, 294.8 F, 294.9, 288 R, 295 AM, 295 R, 297 B, 297 R

[56] References Cited
PUBLICATIONS

Teotino et al., Farmaco (Pavia), Ed. Sci., vol. 17, pp. 988–999 (1962).

Primary Examiner—John D. Randolph
Attorney, Agent, or Firm—John J. Kolano; Thomas R. Boland

[57] ABSTRACT

Cardiac arrhythmias can be treated by administering an effective amount of 3-aryl-1-(2- or 4-iminodihydro-1-pyridyl)-2-propanol or pharmaceutically acceptable acid addition salt.

16 Claims, No Drawings

3-ARYL-1-(2- OR 4-IMINODIHYDRO-1-PYRIDYL)-2-PROPANOL ANTIARRHYTHMIC COMPOUNDS

BACKGROUND OF THE INVENTION

This invention relates to novel 3-aryl-1-(2- or 4-iminodihydro-1-pyridyl)-2-propanols having cardiovascular effects and in particular antiarrhythmic activity.

Some 3-aryl-1-amino-2-propanols have been disclosed in the prior art.

3-(1-Naphthyl)-1-isopropylamino-2-propanol and 3-(2-naphthyl)-1-isopropylamino-2-propanol are disclosed by Crowther, A. F., and Smith, L. H., *J. Med. Chem.* 11, 1009–1013 (1968) and in British Patent 1,021,933 to have modest β-adrenergic blocking activity. 3-(1-Naphthyl)-1-isopropylamino-2-propanol is also disclosed by Adlerova, E.; Trcka, V.; Smejkal, V.; and Protiva, M., *Collect. Czech. Chem. Commun.* 34, 479–484 (1969) to have antiarrhythmic activity.

Other 3-aryl-1-amino-2-propanols, 3-aryl-1-alkylamino-2-propanols, and 3-aryl-1-dialkylamino-2-propanols are disclosed by Fourneau, E.; Trefouel, J.; and Trefouel, J., *Bull. Soc. Chim. France* [4] 43, 454–458 (1928), and Beasley, Y. M.; Petrow, Y.; Stephenson, O.; and Wild, A. M., *J. Pharm. Pharmacol.* 11, 36–42 (1959), but no disclosure of pharmacological utility for these compounds is found in these publications. No 3-aryl-1-(2- or 4-iminopyridyl)-2-propanols are disclosed in the prior art.

SUMMARY OF THE INVENTION

It is an object of this invention to provide novel chemical compounds for use as cardiovascular drugs and in particular for use as antiarrhythmic drugs.

It has now been discovered that the objects of the invention can be attained by administering a therapeutically effective dose of a novel 3-aryl-1-(2- or 4-iminodihydro-1-pyridyl)-2-propanol having the structural formula:

$$A-CH_2-\underset{\underset{OR_6}{|}}{CH}-CH_2-Z$$

wherein: A is an aromatic radical selected from the group consisting of:

(a) substituted phenyl groups having the formula:

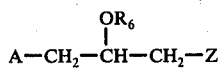

wherein $R_1$, $R_2$, $R_3$, $R_4$, and $R_5$, which may be the same or different, are substituents selected from the group consisting of:
hydrogen,
alkyl,
alkenyl,
alkynyl,
cycloalkyl,
phenyl,
alkoxy,
halo,
hydroxy,
hydroxymethyl,
amino,
acyloxy,
acylamino,
acylalkylamino,
dialkylamino,
trifluoromethyl,
nitro,
cyano,
acyl,
formyl,
carboxy,
alkoxycarbonyl,
carbamoyl,
alkylsulfonyl,
alkoxyalkyl,
carboxyalkyl,
carbamoylalkyl,
alkoxyalkoxy, provided that at least one of $R_1$, $R_2$, $R_3$, $R_4$, and $R_5$ must be hydrogen, no more than 4 may be loweralkyl, no more than three may be loweralkoxy, no more than 2 may be halogen, and no more than 1 may be any of the other substituents; and the total carbon content of all the substituents must not exceed 6 carbon atoms;

(b) naphthyl and naphthyl substituted with no more than two alkyl groups and no more than one other substituent selected from the group consisting of
halo,
alkoxy,
nitro,
aminosulfonyl,
acylamino,
provided that the total carbon content of all the substituents must not exceed 4 carbon atoms;

(c) polycyclic carbocyclic radicals selected from the group consisting of
indenyl,
indanyl,
5,6,7,8-tetrahydronaphthyl,
6,7,8,9-tetrahydro-5H-benzocycloheptenyl,
5,6,7,8,9,10-hexahydrobenzocyclooctenyl,
5,6,7,8-tetrahydro-5,8-methano-1-naphthyl,
5,6,7,8-tetrahydro-5,8-ethano-1-naphthyl, (d) bicyclic heterocyclic radicals selected from the group consisting of
4-benzofuranyl,
7-benzofuranyl,
2-acetyl-7-benzofuranyl,
4-benzothienyl,
7-benzothienyl,
8-thiochromanyl,
5-quinolyl,
5-isoquinolyl;

Z is an iminodihydropyridyl radical having the structural formula

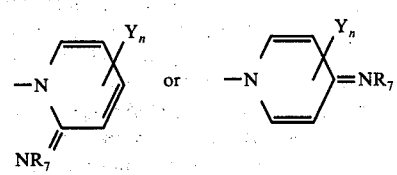

wherein: Y is selected from the group consisting of
hydrogen, loweralkyl,
loweralkenyl,
loweralkoxy,
alkoxycarbonyl,
loweracyl,
loweracyloxy,
loweracylamino,
carbamoyl,
cyano,
halo,
nitro,
hydroxymethyl,
hydroxy,
carboxy,
amino, and $n = 1$ or 2 when Y is loweralkyl or halo
and $n = 1$ in all other cases;

$R_6$ is selected from the group consisting of
hydrogen,
loweralkoxycarbonyl,
loweracyl,
carboxyloweracyl,
carbamoyl,
thiocarbamoyl; and $R_7$ is selected from the group consisting of
hydrogen,
loweralkyl,
loweralkenyl,
loweralkynyl,
$C_3$–$C_6$ cycloalkyl,
$C_4$–$C_8$ cycloalkylalkyl,
phenyl,
benzyl,
phenylethyl,
loweralkoxycarbonyl,
loweracyl,
carboxyloweracyl,
carbamoyl,
thiocarbamoyl;

and pharmaceutically acceptable acid addition salts. "Lower" in the above definition is to be taken as encompassing up to 6 carbon atoms.

The compounds of this invention have cardiovascular effects and in particular antiarrhythmic activity.

DESCRIPTION OF THE PREFERRED EMBODIMENTS

Representative radicals which may be incorporated as group A in the novel compounds of this invention include phenyl, 2-methylphenyl, 3-methylphenyl, 4-methylphenyl, 2-ethylphenyl, 3-ethylphenyl, 4-ethylphenyl, 2-propylphenyl, 3-propylphenyl, 4-propylphenyl, 2-isopropylphenyl, 3-isopropylphenyl, 4-isopropylphenyl, 2-n-butylphenyl, 3-n-butylphenyl, 4-n-butylphenyl, 2-(1-methylpropyl)phenyl, 3-(1-methylpropyl)phenyl, 4-(1-methylpropylphenyl), 2-isobutylphenyl, 3-isobutylphenyl, 4-isobutylphenyl, 2-t-butylphenyl, 3-t-butylphenyl, 4-t-butylphenyl, 2-n-pentylphenyl, 3-n-pentylphenyl, 4-n-pentylphenyl, 2-(1-methylbutyl)phenyl, 3-(1-methylbutyl)phenyl, 4-(1-methylbutyl)phenyl, 2-(2-methylbutyl)phenyl, 3-(2-methylbutyl)phenyl, 4-(2-methylbutyl)phenyl, 2-(3-methylbutyl)phenyl, 3-(3-methylbutyl)phenyl, 4-(3-methylbutyl)phenyl, 2-(2,2-dimethylpropyl)phenyl, 3-(2,2-dimethylpropyl)phenyl, 4-(2,2-dimethylpropyl)phenyl, 2-n-hexylphenyl, 3-n-hexylphenyl, 4-n-hexylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,3,4-trimethylphenyl, 2,3,5-trimethylphenyl, 2,3,6-trimethylphenyl 2,4,5-trimethylphenyl, 2,4,6-trimethylphenyl, 2,3,4,5-tetramethylphenyl, 2,3,4,6-tetramethylphenyl, 2,3,5,6-tetramethylphenyl, 2-ethyl-3-methylphenyl, 2-ethyl-4-methylphenyl, 2-ethyl-5-methylphenyl, 2-ethyl-6-methylphenyl, 2,3-diethylphenyl, 2,4-diethylphenyl, 2-propyl-3-ethylphenyl,2-vinylphenyl,3-vinylphenyl, 4-vinylphenyl, 2-allylphenyl, 3-allylphenyl, 4-allylphenyl, 2-ethynylphenyl, 3-ethynylphenyl, 4-ethynylphenyl, 3-cyclopropylphenyl, 4-cyclopropylphenyl, 2-biphenylyl, 3-biphenylyl, 4-biphenylyl, 2-methoxyphenyl, 3-methoxyphenyl, 4-methoxyphenyl, 2-ethoxyphenyl, 3-ethoxyphenyl, 4-ethoxyphenyl, 2-n-propoxyphenyl, 3-n-propoxyphenyl, 4-n-propoxyphenyl, 2-isopropoxyphenyl, 3-isopropoxyphenyl, 4-isopropoxyphenyl, 4-n-butoxyphenyl, 4-t-butoxyphenyl, 2-allyloxyphenyl, 3-allyloxyphenyl, 4-allyloxyphenyl, 2,3-dimethoxyphenyl, 2,4-dimethoxyphenyl, 2,5-dimethoxyphenyl, 2,6-dimethoxyphenyl, 3,4-dimethoxyphenyl, 3,5-dimethoxyphenyl, 2,3,4-trimethoxyphenyl, 2,3,5-trimethoxyphenyl, 2,4,5-trimethoxyphenyl, 2,3,6-trimethoxyphenyl, 2,4,6-trimethoxyphenyl, 3,4,5-trimethoxyphenyl, 2-chlorophenyl, 3-chlorophenyl, 4-chlorophenyl, 2-fluorophenyl, 3-fluorophenyl, 4-fluorophenyl, 2-bromophenyl, 3-bromophenyl, 4-bromophenyl, 2-trifluoromethylphenyl, 3-trifluoromethylphenyl, 3-trifluoromethylphenyl, 4-trifluoromethylphenyl, 2-hydroxyphenyl, 3-hydroxyphenyl, 4-hydroxyphenyl, 2-hydroxymethylphenyl, 3-hydroxymethylphenyl, 4-hydroxymethylphenyl, 2-aminophenyl, 3-aminophenyl, 4-aminophenyl, 2-nitrophenyl, 3-nitrophenyl, 4-nitrophenyl, 2-cyanophenyl, 3-cyanophenyl, 4-cyanophenyl, 2-formylphenyl, 3-formylphenyl, 4-formylphenyl, 2-acetylphenyl, 3-acetylphenyl, 4-acetylphenyl, 2-acetoxyphenyl, 3-acetoxyphenyl, 4-acetoxyphenyl, 2-carboxyphenyl, 3-carboxyphenyl, 4-carboxyphenyl, 2-(methoxycarbonyl)phenyl, 3-(methoxycarbonyl)phenyl, 4-(methoxycarbonyl)phenyl, 2-carbamoylphenyl,3-carbamoylphenyl, 4-carbamoylphenyl, 2-dimethylaminophenyl, 2-acetylaminophenyl, 2-(acetyl)methylaminophenyl, 2-methylsulfonylphenyl, 3-methylsulfonylphenyl, 4-methylsulfonylphenyl, 2-methylsulfonamidophenyl, 3-methylsulfonamidophenyl, 4-methylsulfonamidophenyl, 2-(2-methoxyethyl)-phenyl, 3-(2-methoxyethyl)phenyl, 4-(2-methoxyethyl)-phenyl, 2-(2-carboxyethyl)phenyl, 3-(carboxyethyl)-phenyl, 4-(carboxyethyl)phenyl, 2-(carbamoylmethyl)-phenyl, 3-(carbamoylmethyl)phenyl, 4-(carbamoylmethyl)phenyl, 2-(2-methoxyethoxy)phenyl, 3-(2-methoxyethoxy)phenyl, 4-(2-methoxyethoxy)phenyl, 2-methyl-3-methoxyphenyl, 2-methyl-4-methoxyphenyl, 2-methyl-5-methoxyphenyl, 2-methyl-6-methoxyphenyl, 2-methoxy-3-methylphenyl, 2-methoxy-4-methylphenyl, 2-methoxy-5-methylphenyl, 1-naphthyl, 2-naphthyl, 2-methyl-1-naphthyl, 3-methyl-1-naphthyl, 4-methyl-1-naphthyl, 5-methyl-1-naphthyl, 6-methyl-1-naphthyl, 7-methyl-1-naphthyl, 8-methyl-1-naphthyl, 2-ethyl-1-naphthyl, 4-ethyl-1-naphthyl, 4-butyl-1-naphthyl, 2,3-dimethyl-1-naphthyl, 2,4-dimethyl-1-naphthyl, 2,5-dimethyl-1-naphthyl, 1-methyl-2-naphthyl, 3-methyl-2-naphthyl, 6-methyl-2-naphthyl, 2-chloro-1-naphthyl, 3-chloro-1-naphthyl, 4-chloro-1-naphthyl, 5-chloro-1-naphthyl, 6-chloro-1-naphthyl, 7-chloro-1-naphthyl, 8-chloro-1-naphthyl, 2-fluoro-1-naphthyl, 4-fluoro-1-naphthyl, 2-bromo-1-naphthyl, 4-bromo-1-naphthyl, 1-chloro-2-naphthyl, 4-chloro-2-naphthyl, 2-methoxy-1-naphthyl, 3-methoxy-1-naphthyl, 4-methoxy-1-naphthyl, 5-methoxy-1-naphthyl, 6-methoxy-1-naphthyl, 7- methoxy-1-naphthyl, 8-methoxy-1-naphthyl, 4-ethoxy-1-naphthyl, 4-n-butoxy-1-naphthyl, 1-methoxy-2-naphthyl, 4-methoxy-2-naphthyl, 6-methoxy-2-naphthyl, 3-nitro-1-naphthyl, 4-nitro-1-naphthyl, 4-aminosulfonyl-1-naphthyl, 4-acetylamino-1-naphthyl, indenyl, indanyl, 5,6,7,8-tetrahydronaphthyl, 6,7,8,9-tetrahydro5H-benzocycloheptenyl, 5,6,7,8,9,10-hexahydrobenzocyclooctenyl, 5,6,7,8-tetrahydro-5,8-methano-1-naphthyl, 5,6,7,8-tetrahydro-5,8-ethano-1-naphthyl, 1,2,3,4-tetrahydro-1-oxo-5-naphthyl, 4-benzofuranyl, 7-benzofuranyl, 2-acetyl-7-benzofuranyl, 4-benzothienyl, 7-benzothienyl, 8-coumarinyl, 5-methyl-8-coumarinyl, 8-thiochromanyl, 5-quinolyl, and 5-isoquinolyl.

Preferred groups for A in the antiarrhythmic compounds of this invention include substituted phenyl groups such as 2-ethylphenyl, 2,3-dimethylphenyl, 2-allylphenyl, 4-ethynylphenyl, 4-cyclohexylphenyl, 2-cyclohexylphenyl, 2-ethoxyphenyl, 3-ethoxyphenyl, 4-ethoxyphenyl, 2-chlorophenyl, 3-chlorophenyl, 4-chlorophenyl, 2-fluorophenyl, 3-fluorophenyl, 4-fluorophenyl, 3-acetoxyphenyl, 4-acetylaminophenyl, 4-dimethylaminophenyl, 2-trifluoromethylphenyl, 3-acetylphenyl, 3-methoxycarbonylphenyl, 4-carbamoylphenyl, 4-methylaminosulfonylphenyl, 4-(2-methoxyethyl)-phenyl, 4-carboxymethylphenyl, 4-carbamoylmethylphenyl, 4-(2-methoxyethoxy)phenyl, 1-naphthyl, 4-indanyl, and 5-indanyl.

More preferred groups are 4-allylphenyl, 4-acetylaminophenyl, 4-carbamoylphenyl, 4-(2-methoxyethyl)phenyl, 4-(2-methoxyethoxy)phenyl, 1-naphthyl, 4-indanyl, and 5-indanyl. Suitable groups for Z in the compounds of this invention include 2-imino-1,2-dihydro-1-pyridyl, 4-imino-1,4-dihydro-1-pyridyl, 2-imino-1,2-dihydro-3-methyl-1-pyridyl, 2-imino-1,2-dihydro-4-methyl-1-pyridyl, 2-imino-1,2-dihydro-5-methyl-1-pyridyl, 2-imino-1,2-dihydro-6-methyl-1-pyridyl, 2-imino-1,2-dihydro-3-ethyl-1-pyridyl, 2-imino-1,2-dihydro-4-propyl-1-pyridyl, 2-imino-1,2-dihydro-4-t-butyl-1-pyridyl, 2-imino-1,2-dihydro-4-allyl-1-pyridyl, 2-imino-1,2-dihydro-3-methoxy-1-pyridyl, 2-imino-1,2-dihydro-4-methoxy-1-pyridyl, 2-dihydro-5-methoxy-1-pyridyl, 2-imino-1,2-dihydro-6-methoxy-1-pyridyl, 2-imino-1,2-dihydro-3-ethoxy-1-pyridyl, 2-imino-1,2-dihydro-3-methoxycarbonyl-1-pyridyl, 2-imino-1,2-dihydro-4-methoxycarbonyl 1-pyridyl, 2-imino-1,2-dihydro-4-ethoxycarbonyl-1-pyridyl, 2-imino-1,2-dihydro-3-carbamoyl-1-pyridyl, 2-imino-1,2-dihydro-4-acetyl-1-pyridyl, 2-imino-1,2-dihydro-4-acetoxy-1-pyridyl, 2-imino-1,2-dihydro-4-acetylamino-1-pyridyl, 2-imino-1,2-dihydro-4-carbamoyl-1-pyridyl, 2-imino-1,2-dihydro-4-cyanopyridyl, 2-imino-1,2-dihydro-3-chloro-1-pyridyl, 2-imino-1,2-dihydro-4-chloro-1-pyridyl 2-imino-1,2-dihydro-5-chloro-1-pyridyl, 2-imino-1,2-dihydro-6-chloro-1-pyridyl, 2-imino-1,2-dihydro-3-fluoro-1-pyridyl, 2-imino-1,2-dihydro-4-fluoro-1-pyridyl, 2-imino-1,2-dihydro-4-bromo-1-pyridyl, 2-imino-1,2-dihydro-3,5-dichloro-1-pyridyl, 2-methylimino-1,2-dihydro-1-pyridyl, 2-imino-1,2-dihydro-4-nitro-1-pyridyl, 2-imino-1,2-dihydro-4-hydroxymethyl-1-pyridyl, 2-imino-1,2-dihydro-4-carboxy-1-pyridyl, 2-imino-1,2-dihydro-4-amino-1-pyridyl, 2-methylimino-1,2-dihydro-1-pyridyl, 2-ethylimino-1,2-dihydro-1-pyridyl, 2-n-propylimino-1,2-dihydro-1-pyridyl, 2-isopropylimino-1,2-dihydro-1-pyridyl, 2-n-butylimino-1,2-dihydro-1-pyridyl, 2-isobutylimino-1,2-dihydro-1-pyridyl, 2-t-butylimino-1,2-dihydro-1-pyridyl, 2-n-pentylimino-1,2-dihydro-1-pyridyl, 2-n-hexylimino-1,2-dihydro-1-pyridyl, 2-allylimino-1,2-dihydro-1-pyridyl, 2-(2-buten-1-yl)-1,2-dihydro-1-pyridyl, 2-propargylimino-1,2-dihydro-1-pyridyl, 2-cyclopropylimino-1,2-dihydro-1-pyridyl, 2-cyclobutylimino-1,2-dihydro-1-pyridyl, 2-cyclopentylimino-1,2-dihydro-1-pyridyl, 2-cyclohexylimino-1,2-dihydro-1-pyridyl, 2-cyclopropylmethylimino-1,2-dihydro-1-pyridyl, 2-cyclohexylmethyl-1,2-dihydro-1-pyridyl, 2-(2-cyclohexylethyl)imino-1,2-dihydro-1-pyridyl, 2-phenylimino-1,2-dihydro-1-pyridyl, 2-benzylimino-1,2-dihydro-1-pyridyl, 2-(1-phenylethyl)imino-1,2-dihydro-1-pyridyl, 2-(2-phenylethyl)imino-1,2-dihydro-1-pyridyl, 2-methoxycarbonylimino-1,2-dihydro-1-pyridyl, 2-ethoxycarbonyl-imino-1,2-dihydro-1-pyridyl, 2-acetylimino-1,2-dihydro-1-pyridyl, 2-propionylimino-1,2-dihydro-1-pyridyl, 2-n-butyrylimino-1,2-dihydro-1-pyridyl, 2-isobutyrylimino-1,2-dihydro-1-pyridyl, 2(3-carboxypropionyl)imino-1,2-dihydro-1-pyridyl, 2-carbamoylimino-1,2-dihydro-1-pyridyl, and 2-thiocarbamoylimino-1,2-dihydro-1-pyridyl.

Suitable groups for $R_6$ in the compounds of this invention are hydrogen, methoxycarbonyl, ethoxycarbonyl, propoxycarbonyl, butoxycarbonyl, acetyl, propionyl, butyryl, benzoyl, 3-carboxypropionyl, 3-carboxyacrylyl, 2-carboxybenzoyl, 3-methoxycarbonylpropionyl, carbamoyl, $_N$-methylcarbamoyl, thiocarbamoyl, 4-carboxy-3-oxobutyryl, 4-carboxy-2,2-dimethylbutyryl, 4-carboxy-3,3-dimethylbutyryl, 3-carboxy-2,3-dimethylacrylyl, 2-carboxymethyl-4-tetradecenoyl, heptafluorobutyryl, 4-carboxy-3-methylbutyryl, 3-carboxy-2-methylpropionyl, 4-carboxy-4-phenylbutyryl, 9-carboxy-3,8-di(carboxymethyl)nonanoyl, (2-carboxyphenyl)acetyl, 3-carboxy-1-2,2-trimethylcyclopentylcarbonyl, 2-carboxy-1-cyclobutylcarbonyl, 2-carboxycyclohexylcarbonyl, 3-carboxy-2-nicotinoyl.

Preferred groups for $R_6$ are hydrogen, methoxycarbonyl, 3-carboxypropionyl, 3-carboxyacrylyl, and 2-carboxybenzoyl.

Preferred groups for Z include 2-imino-1,2-dihydropyridyl groups having the formula

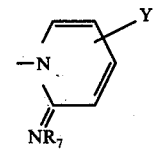

wherein Y is selected from the group consisting of hydrogen, loweralkyl, and loweralkoxy, and $R_7$ is selected from the group consisting of hydrogen, loweralkyl, and loweralkoxycarbonyl.

By combination of the groups defined above for A and Z different antiarrhythmic compounds can be prepared. The preferred compounds are those in which A is selected from the group consisting of 2-ethylphenyl, 2,3-dimethylphenyl, 4-allylphenyl, 4-ethynylphenyl, 4-cyclohexylphenyl, 2-cyclohexylphenyl, 2-ethoxyphenyl, 3-ethoxyphenyl, 4-ethoxyphenyl, 2-chlorophenyl, 3-chlorophenyl, 4-chlorophenyl, 2-fluorophenyl, 3-fluorophenyl, 4-fluorophenyl, 3-acetoxyphenyl, 4-acetylaminophenyl, 4-dimethylaminophenyl, 2-trifluoromethylphenyl, 3-acetylphenyl, 3-methoxycarbonylphenyl, 4-carbamoylphenyl, 4-methylaminosulfonylphenyl, 4-(2-methoxyethyl)phenyl, 4-carboxymethyl, 4-carbamoylmethylphenyl, 4-(2-methoxyethoxy)phenyl 1-naphthyl, 4-indanyl, and 5-indanyl: Z is selected from the group consisting of 2-imino-1,2-dihydropyridyl radicals having the formula

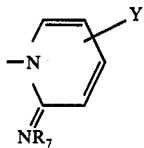

wherein Y is selected from the group consisting of hydrogen, loweralkyl, and loweralkoxy; $R_7$ is selected from the group consisting of hydrogen, loweralkyl, loweracyl and lower-alkoxycarbonyl and $R_6$ is selected from the group consisting of hydrogen, methoxycarbonyl, and loweracyl.

The antiarrhythmic compounds of this invention may be synthesized by reacting a 3-aryl-1,2-epoxypropane with a suitably substituted 2-aminopyridine in a suitable solvent such as a mixture of methanol and water at room temperature or at an elevated temperature. The reaction may be represented by the equation:

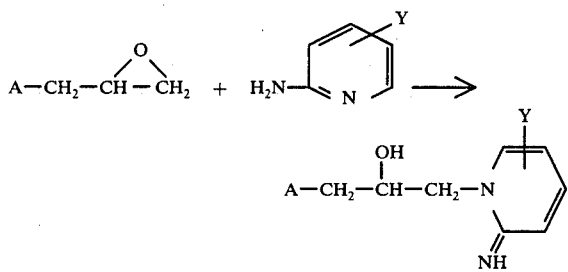

The reaction is complete in a few days, and the product is isolated by procedures well known to those skilled in the art.

The 3-aryl-1,2-epoxypropane may be prepared from the corresponding aryl bromide and epichlorohydrin by procedures well known in the art. A description of the procedure for synthesis of the 3-aryl-1,2-epoxypropanes may be found in E. Fourneau, et. al., Bull. Soc. Chim. France [iv] 43, 454–458 (1928).

The compounds of this invention may also be prepared by reacting an aryl-substituted halohydrin with a suitably substituted 2-aminopyridine according to the equation:

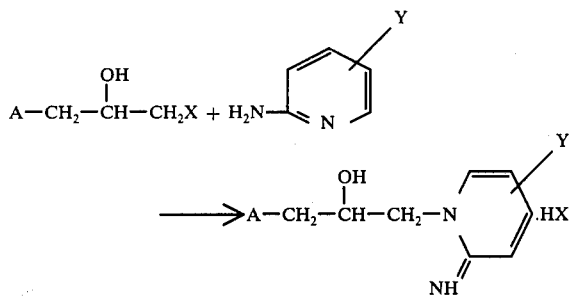

wherein X is the anion of an acid such as Cl, Br, I,

$OSO_2CH_3$, and the like. The reaction may be carried out in a suitable solvent at room temperature or at an elevated temperature. The aryl-substituted halohydrin can also be prepared by the procedure of Fourneau, et al.

Alernatively the 3-aryl-1,2-epoxypropane may be prepared by reacting a 3-aryl-1-propene with a peroxycarboxylic acid such as peroxyacetic acid or peroxybenzoic acid according to procedures well-known in the art.

3-Aryl-1,2-epoxypropanes may also be prepared from 3-aryl-1-propenes by reacting them first with a hypohalous acid to form a 3-arylhalohydrin followed by reaction of the halohydrin with a base to form the epoxide, according to the reaction scheme

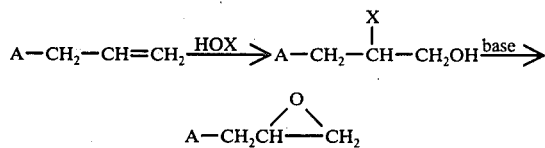

wherein X stands for a halogen (Cl, Br, I).

Methods of preparing epoxides are discussed in Houben-Weyl, Methoden der Organischen Chemie, 4th Ed., Vol. 6/3, Georg Thieme Verlag, Stuttgart, 1965, pp. 367–487, in R. J. Gritter, "Reactions of Cyclic Ethers" in S. Patai, Ed., The chemistry of the Ether Linkage, Interscience Publishers, New York, 1967, pp. 381–411, and in S. Winstein and R. B. Henderson, "Ethylene and Trimethylene Oxides" in R. C. Elderfield, Ed., Heterocyclic Compounds, Vol. 1, John Wiley and Sons, Inc., New York, 1950.

Another way to prepare suitable intermediate epoxides is by reacting a 2-aryl acetaldehyde with dimethyloxosulfonium methylide or similar reagents by the procedure of Corey, E. J. and Chaykovsky, M., J. Am. Chem. Soc. 87, 1353 (1965).

Compounds with various substituents on the aromatic nucleus of the A group can be prepared from corresponding aryl bromides by the procedure of Fourneau, et al.

Likewise, compounds containing Z groups having various Y substituents can be prepared by starting with the appropriately substituted 2-aminopyridine.

Compounds wherein $R_7$ is loweralkyl can be prepared by using a N-alkyl-2-aminopyridine as the starting material for the synthesis. Compounds wherein $R_7$ is loweralkyl can also be prepared by direct alkylation of the corresponding compound having $R_7=H$ by reaction with the customary alkylating agents such as alkyl halides, alkyl p-toluenesulfonates, and the like.

Compounds wherein $R_6$ or $R_7$ is alkoxycarbonyl, acyl, carboxyacyl, carbamoyl or thiocarbamoyl may be prepared by reacting the corresponding compound wherein $R_6$ or $R_7$ is hydrogen with a suitable reagent. To prepare the alkoxycarbonyl and acyl derivatives alkyl chloroformates, acyl halides, or anhydrides of lower carboxylic acids may be used. To prepare the carboxyacyl derivatives, cyclic anhydrides, such as succinic anhydride, maleic anhydride, and phthalic anhydride are suitable. To prepare carbamoyl, n-alkylcarbamoyl, thiocarbamoyl, thiocarbamoyl, and n-alkylthiocarbamoyl derivatives, the corresponding isocyanate or isothiocyanate may be used. If both $R_6$ and $R_7$ are to be converted to the derivative, two moles of reagent are reacted with one mole of the corresponding 2-propanol. If only one of $R_6$ and $R_7$ is to be converted, one mole of reagent is used. It will be understood that to prepare derivatives having only one of $R_6$ and $R_7$ derivatives the reaction conditions may have to be adjusted to favor reaction at either $R_6$ or $R_7$.

It will be recognized by those skilled in the art that certain substituents in the A portion of the compounds of this invention are incapable of coexisting with the Grignard reagents used for preparing the intermediates during the synthesis of the compounds of this invention. Two general methods of circumventing this problem are available. The group may be protected while the Grignard reaction is carried out or the group may be introduced after the Grignard step has been completed.

By way of example, a hydroxyl group on the Gridnard precursor can be protected by reaction with dihydropyran to form an ether, which will not be affected by the Grignard reaction. The relatively labile ether linkage will be cleaved in the workup following the Grignard reaction. The reaction sequence would then be as follows:

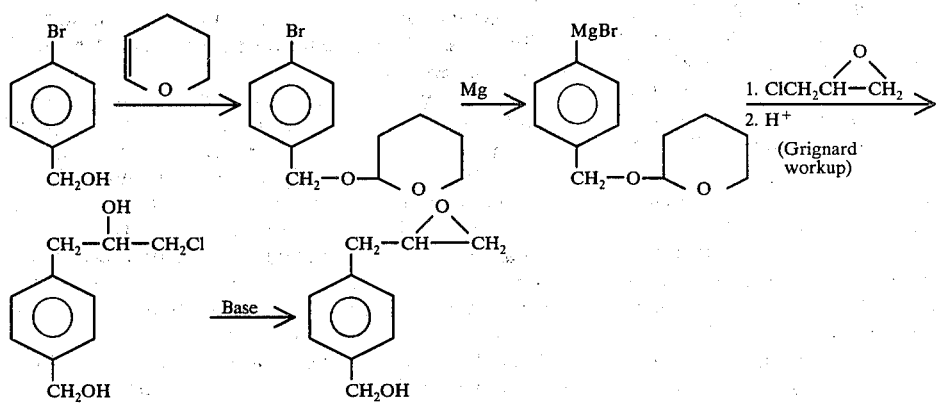

In another example, an aldehyde or ketone carbonyl group, may be protected by reaction with ethylene glycol to form a ketal:

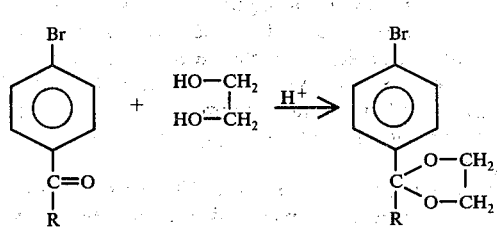

Again the protecting group is removed during the workup of the subsequent Grignard reaction.

The choice of methods for protecting the various groups is within the competence of a skilled practitioner. Details of such methods may be found, eg., in J. W. F. McOmie, Protective Groups In Organic Chemistry, Plenum Press, London, 1973.

An alternative procedure for preparing compounds having Gridnard-incompatible groups is to introduce the group after the Gridnard step, frequently, by modifying a Gridnard-compatible precursor group. For example, a carboxylic acid group could be introduced by starting with a compound containing a formyl group, protecting the formyl group during the Gridnard step as shown above, regenerating the formyl group, and subsequently oxidizing it to a carboxyl group. Esterification of the carboxyl group so produced could yield an ester group. Thus, the introduction of the substituents into the A group of the compounds of this invention may be carried out by procedures known to those skilled in the art.

The A groups containing a halide atom such as bromine may be prepared by using an aryl iodide to prepare an iodine Gridnard reagent:

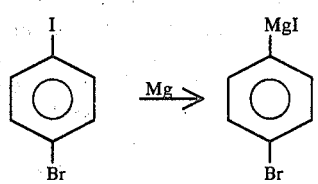

which may then be used for the next step of the synthesis.

Compounds wherein $R_6$ or $R_7$ is alkoxycarbonyl, acyl, carboxyacyl, carbamoyl or thiocarbamoyl may be prepared by reacting the corresponding compound wherein $R_6$ or $R_7$ is hydrogen with a suitable reagent. To prepare the alkoxycarbonyl and acyl derivatives alkyl chloroformates, acyl halides, or anhydrides of lower carboxylic acids may be used. To prepare the carboxyacyl derivatives, cyclic anhydrides, such as succinic anhydride, maleic anhydride, and phthalic anhydride are suitable. To prepare carbamoyl, n-alkylcarbamoyl, thiocarbamoyl, and n-alkylthiocarbamoyl derivatives, the corresponding isocyanate or isothiocyanate may be used. If both $R_6$ and $R_7$ are to be converted to the derivative, two moles of reagent are reacted with one mole of the corresponding 2-propanol. If only one of $R_6$ and $R_7$ is to be converted, one mole of reagent is used. If will be understood that to prepare derivatives having only one of $R_6$ and $R_7$ derivatized the reaction conditions may have to be adjusted to favor reaction at either $R_6$ or $R_7$.

The compounds in which Z is a 4-imino-1,4-dihydro-1-pyridyl radical may be prepared in the same way as those in which Z is a 2-imino-1,2-dihydro-1-pyridyl group by using an appropriately substituted 4-aminopyridine as a reagent in place of the 2-amino-pyridine in the reaction described above.

The compounds of this invention may be converted to their pharmaceutically acceptable acid addition salts by methods customary in the art. The pharmaceutically acceptable salts of this invention are those salts, the acid component of which is pharmacologically acceptable in the intended dosages. Suitable salts are those prepared from inorganic acids or organic acids. Such acids include: hydrochloric acid, hydrobromic acid, nitric acid, sulfuric acid, sulfamic acid, the polyphosphoric acids, phosphoric acid, glycerophosphoric acid, acetic acid, propionic acid, butyric acid, succinic acid, glycolic acid, 2,3-dihydroxypropionic acid, saccharic acid, gluconic acid, lactobionic acid, phenylacetic acid, cyclohexanecarboxylic acid, maleic acid, fumaric acid, lactic acid, citric acid, malic acid, camphoric acid, benzoic acid, tartaric acid, aspartic acid, salicyclic acid, phthalic acid, methanesulfonic acid, ethanesulfonic acid, benzenesulfonic acid, toluenesulfonic acid, nicotinic acid, ascorbic acid and the like. Preferred acids are hydrochloric, hydrobromic, acetic, benzoic and p-toluenesulfonic.

The compounds of this invention possess one or more asymmetric carbon atoms and consequently can be obtained as racemates or as dextro- (+) and levorotatory (−) isomers. These may be separated by any of the known methods of resolution. A method that may be employed is combining the racemic modification with an optically active acid, for example by salt formation. Two products are then obtained. If the compounds of this invention are added to an optically active acid such as (+) or (−) tartaric acid, then the salts produced possess different properties and different solubilities and can be separated by fractional crystallization. When the salts have been separated by repeated crystallization, the acid is split off and the pure (+) or (−) isomer is obtained. It is to be understood that these optical isomers are embraced within the extent of this invention. Likewise the configuration about the 2-amino group in the Z portion of the compounds of this invention may be syn or anti depending on the orientation of $R_7$ (when $R_7 \neq H$) with respect to the nitrogen atom of the 2-imino-1,2-dihydro-1-pyridyl ring. Both configurations are included among the compounds of the invention.

The antiarrhythmic activity of the compounds of this invention was tested in vivo by the following standard tests.

The effectiveness of the compounds against ouabain-induced ventricular tachycardia was evaluated by the following procedure.

Mongrel dogs of either sex weighing between 7 and 12 kg were anesthetized with sodium pentobarbital, 30 mg/kg, i.v. The femoral artery was cannulated and arterial blood pressure measured via a pressure transducer connected to a strip chart recorder. Mean arterial pressure was derived electronically. The right vagus nerve was sectioned and its distal end stimulated at a frequency of 50 cycles per second. The stimulation voltage was determined for each animal prior to drug administration and was in the range of 3 to 4 volts. Throughout the experiment, Lead II electrocardiogram was continuously recorded.

The antiarrhythmic activity of standard and unknown compounds was determined according to a modification of the method of Lucchesi and Hardman J. Pharmacol Exp. Therap. 13, 372–81, 1961. Ouabain was injected at a dose of 40 µg/kg followed in 30 minutes by injections of 10 µg/kg every 15 minutes until ventricular or nodal tachycardia occurred. The arrhythmia was shown to be independent of the sino-atrial pacemaker by the failure of right vagal stimulation to alter its rate. The venticular rhythm was allowed to continue for 20 minutes and then the test drugs were administered. In control dogs, the untreated arrhythmia persisted for at least two hours.

Test drugs were administered by titration until the arrhythmia was reversed. The criteria for antiarrhythmic activity were:

(1) Reversion to normal sinus rhythm within a few minutes following drug administration (iv).
(2) Maintenance of sinus rhythm for 30 minutes or longer.
(3) Failure of right vagal stimulation to trigger ectopic ventricular beats.

In some of the animals, return of arrhythmia was produced by administering 40 units of intravenous insulin in order to demonstrate the continued presence of ouabain in sufficient concentrations to induce cardiac toxicity.

For intravenous administration drugs were dissolved in physiologic saline and given in a volume of 0.1 ml/kg. For oral administration drugs were delivered through a tube positioned in the stomach. For intraduodenal administration the abdomen was opened and a catheter positioned directly into the duodenum.

The effectiveness of the compounds against acetylcholine-induced ventricular fibrillation was determined by the following procedure.

Mongrel dogs unselected as to age or sex and ranging from 10 to 15 kg in weight were anesthetized by an intravenous injection of pentobarbital sodium, 30 mg/kg. In each dog a polyethylene cannula was inserted into the left femoral artery and connected to a transducer for blood pressure measurements. The left femoral vein was also catheterized for the purpose of drug injections. Artificial ventilation with room air was maintained by a Harvard positive-pressure respirator through a cuffed endotracheal tube.

Lead II electrocardiograms were monitored continuously on an oscilloscope and all recordings were made on an eight channel strip chart recorder.

After a mid-sternal thoracotomy, the pericardium was reflected from the right atrium and sutured to the thoracic wall to form a cradle. Selective atrial fibrillation was induced by applying a few drops of a 4% aqueous solution of acetylcholine directly to the right atrium through a 20 gauge needle and then stroking the atrial area a few times with a blunt spatula. The duration of atrial fibrillation was determined by noting on the electrocardiogram the time required for sinus rhythm to reappear.

After two control periods of fibrillation were obtained, drugs were then administered either intravenously, orally, or intraduodenally. Attempts were then made to reinduce atrial fibrillation at the following time intervals: 15, 30, 60 and 120 minutes after drug administration. A given dose of a drug was considered to be active if it significantly reduced the duration of the atrial arrhythmia at any of the above time intervals.

All drugs were administered as pharmaceutically acceptable salts and the results were analysed by Student's "T" test.

The effect of the compounds against ventricular arrhythmias after coronary ligation simulating myocardial infarction was determined by the following procedure.

Experimental myocardial infarction was produced in mongrel dogs (10–15 kg) under general anaesthesia with sodium pentobarbital, 30 mg/kg, i.v., and under artificial respiration maintained with a Harvard positive-pressure respirator. Under aseptic conditions, the thorax was opened at the fourth intercostal space. The pericardium was incised and the anterior descending branch of the left coronary artery was dissected free about 8 mm distal to the edge of the left atrial appendage. Two silk ligatures were passed under the artery and the vessel was ligated in two stages according to the method described by A. S. Harris, Circulation 1, 1318 (1950). After closure of the pericardium and the thorax and when the respiration became spontaneous, the animal was maintained under supervision until awakening, 3 to 4 hours later.

The following day, eighteen hours post-surgery, the animals presented with a permanent extrasystolic arrhythmia. This arrhythmia was quantitated by counting every heart beat during a 5-minute period and noting the number of normal and abnormal depolarizations. All animals were studied in the unanesthetized state. Lead III electrocardiogram was continuously recorded while the animals were supported in a harness and maintained in a quiet environment. These animals were trained prior to surgery to lie quietly while ECG recordings were made. Drugs to be studied were injected directly into the brachial vein or were given orally contained in gelatin capsules. The criteria for inclusion into the study were as follows:

(1) The number of ectopic beats should be greater than 30% of the total number of beats per minute.
(2) The frequency of abnormal beats should remain constant for a two-hour monitoring period prior to drug administration.

After drug administration, the ECG was taken at 15-minute intervals for at least 4 hours. Results were recorded as percent reduction in the number of ectopic beats.

By means of the above tests the antiarrhythmic activity of the compounds of this invention was demonstrated in vivo.

The following examples are intended to illustrate the practice of this invention without limiting its scope.

EXAMPLE I

This example illustrates the synthesis of 3-(1-naphthyl)-1-(2-imino-1,2-dihydro-1-pyridyl)-2-propanol.

16.21 Grams (0.088 mole) of 3-(1-naphthyl)-1,2-epoxypropane and 7.53 grams (0.08 mole) of 2-aminopyridine were combined in 8.8 ml of 90:10 methanol-water mixture and allowed to stand at room temperature for several days. As the reaction proceeded a precipitate formed. The progress of the reaction was monitored by thin layer chromatography. When the reaction was complete the precipitate was triturated with ether, collected by filtration, dried, and recrystallized from isopropyl alcohol to yield 3-(1-naphthyl)-1-(2-imino-1,2-dihydro-1-pyridyl)-2-propanol. M.P. 156°–157° C.

6.0 Grams of this product were dissolved in methanol. Concentrated hydrochloric acid was added dropwise until the pH of the solution was 1.0. The methanol was evaporated in vacuo and the residue was triturated with ether. The solid was collected on a filter and dried to yield 3-(1-naphthyl)-1-(2-imino-1,2-dihydro-1-pyridyl)-2-propanol hydrochloride hemihydrate. M.P. 90° C. — foam, 110° C. — clear melt.

EXAMPLE II

This example illustrates the synthesis of a number of compounds of this invention.

By a procedure similar to that of Example I, using the reagents listed in columns 1 and 2 of Table I, the compounds listed in Column 3 of Table I were prepared.

TABLE I

| REAGENTS | | PRODUCT |
| --- | --- | --- |
| 3-(1-naphthyl)-1,2-epoxypropane | 2-amino-3-methylpyridine | 3-(1-naphthyl)-1-(2-imino-1,2-dihydro-3-methyl-1-pyridyl)-2-propanol |
| 3-(1-naphthyl)-1,2-epoxypropane | 2-amino-4-methylpyridine | 3-(1-naphthyl)-1-(2-imino-1,2-dihydro-4-methyl-1-pyridyl)-2-propanol |
| 3-(1-naphthyl)-1,2-epoxypropane | 2-amino-5-methylpyridine | 3-(1-naphthyl)-1-(2-imino-1,2-dihydro-5-methyl-1-pyridyl)-2-propanol |
| 3-(1-naphthyl)-1,2-epoxypropane | 4-aminopyridine | 3-(1-naphthyl)-1-(4-imino-1,4-dihydro-1-pyridyl)-2-propanol |
| 3-(1-naphthyl)-1,2-epoxypropane | 2-methylaminopyridine | 3-(1-naphthyl)-1-(2-methyl-imino-1,2-dihydro-1-pyridyl)-2-propanol |
| 3-(2-naphthyl)-1,2-epoxypropane | 2-aminopyridine | 3-(2-naphthyl)-1-(2-imino-1,2-dihydro-1-pyridyl)-2-propanol |
| 3-phenyl-1,2-epoxypropane | 2-aminopyridine | 3-phenyl-1-(2-imino-1,2-dihydro-1-pyridyl)-2-propanol |
| 3-phenyl-1,2-epoxypropane | 2-amino-3-methylpyridine | 3-phenyl-1-(2-imino-1,2-dihydro-3-methyl-1-pyridyl)-2-propanol |
| 3-(2-methylphenyl)-1,2-epoxypropane | 2-aminopyridine | 3-(2-methylphenyl)-1-(2-imino-1,2-dihydro-1-pyridyl)-2-propanol |
| 3-(2-methylphenyl)-1,2-epoxypropane | 2-amino-3-methylpyridine | 3-(2-methylphenyl)-1-(2-imino-3-methyl-1,2-dihydro-1-pyridyl)-2-propanol |
| 3-(3-methylphenyl)-1,2-epoxypropane | 2-aminopryidine | 3-(3-methylphenyl)-1-(2-imino-1,2-dihydro-1-pyridyl)-2-propanol |
| 3-(2,3-dimethylphenyl)-1,2-epoxypropane | 2-aminopyridine | 3-(2,3-dimethylphenyl)-1-(2-imino-1,2-dihydro-1-pyridyl)-2-propanol |
| 3-(2,4-dimethylphenyl)-1,2-epoxypropane | 2-aminopyridine | 3-(2,4-dimethylphenyl)-1-(2-imino-1,2-dihydro-1-pyridyl)-2-propanol |
| 3-(2,5-dimethylphenyl)-1,2-epoxypropane | 2-aminopyridine | 3-(2,5-dimethylphenyl)-1-(2-imino-1,2-dihydro-1-pyridyl)-2-propanol |
| 3-(2,6-dimethylphenyl)-1,2-epoxypropane | 2-aminopyridine | 3-(2,6-dimethylphenyl)-1-(2-imino-1,2-dihydro-1-pyridyl)-2-propanol |
| 3-(3,4-dimethylphenyl)-1,2-epoxypropane | 2-aminopyridine | 3-(3,4-dimethylphenyl)-1-(2-imino-1,2-dihydro-1-pyridyl)-2-propanol |
| 3-(3,5-dimethylphenyl)-1,2-epoxypropane | 2-aminopyridine | 3-(3,5-dimethylphenyl)-1-(2-imino-1,2-dihydro-1-pyridyl)-2- |

TABLE I-continued

| REAGENTS | | PRODUCT |
|---|---|---|
| 3-(2-ethylphenyl)-1,2-epoxy-propane | 2-aminopyridine | 3-(2-ethylphenyl)-1-(2-imino-1,2-dihydro-1-pyridyl)-2-propanol |
| 3-(2,3,5-trimethylphenyl)-1,2-epoxypropane | 2-aminopyridine | 3-(2,3,5-trimethylphenyl)-1-(2-imino-1,2-dihydro-1-pyridyl)-2-propanol |
| 3-(4-methylphenyl)-1,2-epoxy-propane | 2-aminopyridine | 3-(4-methylphenyl)-1-(2-imino-1,2-dihydro-1-pyridyl)-2-propanol |
| 3-(2-n-propylphenyl)-1,2-epoxy-propane | 2-aminopyridine | 3-(2-n-propylphenyl)-1-(2-imino-1,2-dihydro-1-pyridyl)-2-propanol |
| 3-(2-t-butylphenyl)-1,2-epoxy-propane | 2-aminopyridine | 3-(2-t-butylphenyl)-1-(2-imino-1,2-dihydro-1-pyridyl)-2-propanol |
| 3-(4-methoxyphenyl)-1,2-epoxy-propane | 2-aminopyridine | 3-(4-methoxyphenyl)-1-(2-imino-1,2-dihydro-1-pyridyl)-2-propanol |
| 3-(2-chlorophenyl)-1,2-epoxy-propane | 2-aminopyridine | 3-(2-chlorophenyl)-1-(2-imino-1,2-dihydro-1-pyridyl)-2-propanol |
| 3-(4-chlorophenyl)-1,2-epoxy-propane | 2-aminopyridine | 3-(4-chlorophenyl)-1-(2-imino-1,2-dihydro-1-pyridyl)-2-propanol |
| 3-[1-(5,6,7,8-tetrahydronaphthyl)]-1,2-epoxypropane | 2-aminopyridine | 2-[1-(5,6,7,8-tetrahydronaphthyl)]-1-(2-imino-1,2-dihydro-1-pyridyl)-2-propanol |
| 3-(4-indanyl)-1,2-epoxypropane | 2-aminopyridine | 3-(4-indanyl)-1-(2-imino-1,2-dihydro-1-pyridyl)-2-propanol |
| 3-(4-chloro-1-naphthyl)-1,2-epoxy-propane | 2-aminopyridine | 3-(4-chloro-1-naphthyl)-1-(2-imino-1,2-dihydro-1-pyridyl)-2-propanol |
| 3-(1-naphthyl)-1,2-epoxypropane | 2-amino-5-chloropyridine | 3-(1-naphthyl)-1-(2-imino-1,2-dihydro-5-chloro-1-pyridyl)-2-propanol |
| 3-(5-indanyl)-1,2-epoxy-propane | 2-aminopyridine | 3-(5-indanyl)-1-(2-imino-1,2-dihydro-1-pyridyl)-2-propanol |
| 3-(2-allyloxyphenyl)-1,2-epoxy-propane | 2-aminopyridine | 3-(4-allyloxyphenyl)-1-(2-imino-1,2-dihydro-1-pyridyl)-2-propanol |
| 3-(4-allylphenyl)-1,2-epoxypropane | 2-aminopyridine | 3-(4-allylphenyl)-1-(2-imino-1,2-dihydro-1-pyridyl)-2-propanol |
| 3-(4-propargylphenyl)-1,2-epoxy-propane | 2-aminopyridine | 3-(4-propargylphenyl)-1-(2-imino-1,2-dihydro-1-pyridyl)-2-propanol |
| 3-(2-cyclopropylphenyl)-1,2-epoxy-propane | 2-aminopyridine | 3-(2-cyclopropylphenyl)-1-(2-imino-1,2-dihydro-1-pyridyl)-2-propanol |
| 3-(4-cyclohexylphenyl)-1,2-epoxy-propane | 2-aminopyridine | 3-(4-cyclohexylphenyl)-1-(2-imino-1,2-dihydro-1-pyridyl)-2-propanol |
| 3-(4-phenylphenyl)-1,2-epoxy-propane | 2-aminopyridine | 3-(4-phenylphenyl)-1-(2-imino-1,2-dihydro-1-pyridyl)-2-propanol |
| 3-(4-fluorophenyl)-1,2-epoxy-propane | 2-aminopyridine | 3-(4-fluorophenyl)-1-(2-imino-1,2-dihydro-1-pyridyl)-2-propanol |
| 3-(4-bromophenyl)-1,2-epoxy-propane | 2-aminopyridine | 3-(4-bromophenyl)-1-(2-imino-1,2-dihydro-1-pyridyl)-2-propanol |
| 3-(4-hydroxymethylphenyl-1,2-epoxypropane | 2-aminopyridine | 3-(4-hydroxymethylphenyl)-1-(2-imino-1,2-dihydro-1-pyridyl)-2-propanol |
| 3-(4-acetoxyphenyl)-1,2-epoxy-propane | 2-aminopyridine | 3-(4-acetoxyphenyl)-1-(2-imino-1,2-dihydro-1-pyridyl)-2-propanol |
| 3-(4-acetamidophenyl)-1,2-epoxy-propane | 2-aminopyridine | 3-(4-acetamidophenyl)-1-(2-imino-1,2-dihydro-1-pyridyl)-2-propanol |
| 3-(4-dimethylaminophenyl)-1,2-epoxypropane | 2-aminopyridine | 3-(4-dimethylaminophenyl)-1-(2-imino-1,2-dihydropyridyl)-2-propanol |
| 3-(3-trifluoromethylphenyl)-1,2-epoxypropane | 2-aminopyridine | 3-(3-trifluoromethylphenyl)-1-(2-imino-1,2-dihydro-1-pyridyl)-2-propanol |
| 3-(4-nitrophenyl)-1,2-epoxy-propane | 2-aminopyridine | 3-(4-nitrophenyl)-1-(2-imino-1,2-dihydro-1-pyridyl)-2-propanol |
| 3-(4-cyanophenyl)-1,2-epoxy-propane | 2-aminopyridine | 3-(4-cyanophenyl)-1-(2-imino-1,2-dihydro-1-pyridyl)-2-propanol |
| 3-(4-acetylphenyl)-1,2-epoxy-propane | 2-aminopyridine | 3-(4-acetylphenyl)-1-(2-imino-1,2-dihydro-1-pyridyl)-2-propanol |
| 3-(4-formylphenyl)-1,2-epoxy-propane | 2-aminopyridine | 3-(4-formylphenyl)-1-(2-imino-1,2-dihydro-1-pyridyl)-2-propanol |
| 3-(4-methoxycarbonylphenyl)-1,2-epoxypropane | 2-aminopyridine | 3-(4-methoxycarbonylphenyl)-1-(2-imino-1,2-dihydro-1-pyridyl)-2-propanol |
| 3-(4-carbamoylphenyl)-1,2-epoxypropane | 2-aminopyridine | 3-(4-carbamoylphenyl)-1-(2-imino-1,2-dihydro-1-pyridyl)-2-propanol |
| 3-(4-methylsulfonylphenyl)-1,2-epoxypropane | 2-aminopyridine | 3-(4-methylsulfonylphenyl)-1-(2-imino-1,2-dihydro-1-pyridyl)-2-propanol |
| 3-(4-methoxymethylphenyl)-1,2-epoxypropane | 2-aminopyridine | 3-(4-methoxymethylphenyl)-1-(2-imino-1,2-dihydro-1-pyridyl)-2-propanol |
| 3-[4-(2-carbamoylethyl)phenyl]-1,2-epoxypropane | 2-aminopyridine | 3-[4-(2-carbamoylethyl)phenyl]-1-(2-imino-1,2-dihydro-1-pyridyl)-2-propanol |
| 3-(4-nitro-naphthyl)-1,2-epoxy-propane | 2-aminopyridine | 3-(4-nitro-1-naphthyl)-1-(2-imino-1,2-dihydro-1-pyridyl)-2-propanol |
| 3-(4-acetylamino-1-naphthyl)-1,2-epoxypropane | 2-aminopyridine | 3-(4-acetylamino-1-naphthyl)-1-(2-imino-1,2-dihydro-1-pyridyl)-2-propanol |
| 3-(4-indenyl)-1,2-epoxypropane | 2-aminopyridine | 3-(4-indenyl)-1-(2-imino-1,2-dihydro-1-pyridyl)-2-propanol |
| 3-(1,2,3,4-tetrahydro-1-oxo-5-naphthyl)-1,2-epoxypropane | 2-aminopyridine | 3-(1,2,3,4-tetrahydro-1-oxo-5-naphthyl)-1-(2-imino-1,2-dihydro-1-pyridyl)-2-propanol |
| 3-(4-methoxynaphthyl)-1,2-epoxy-propane | 2-aminopyridine | 3-(4-methoxynaphthyl)-1-(2-imino-1,2-dihydro-1-pyridyl)-2-propanol |
| 3-(7-benzofuranyl)-1,2-epoxy-propane | 2-aminopyridine | 3-(7-benzofuranyl)-1-(2-imino-1,2-dihydro-1-pyridyl)-2-propanol |
| 3-(2-acetyl-7-benzofuranyl)-1,2-epoxypropane | 2-aminopyridine | 3-(2-acetyl-7-benzofuranyl)-1-(2-imino-1,2-dihydro-1-pyridyl)-2-propanol |
| 3-(7-benzothienyl)-1,2-epoxy- | 2-aminopyridine | 3-(7-benzothienyl)-1-(2-imino-1,2- |

TABLE I-continued

| REAGENTS | | PRODUCT |
|---|---|---|
| propane | | dihydro-1-pyridyl)-2-propanol |
| 3-(8-thiochromanyl)-1,2-epoxypropane | 2-aminopyridine | 3-(8-thiochromanyl)-1-(2-imino-1,2-dihydro-1-pyridyl)-2-propanol |
| 3-(5-quinolyl)-1,2-epoxypropane | 2-aminopyridine | 3-(5-quinolyl)-1-(2-imino-1,2-dihydro-1-pyridyl)-2-propanol |
| 3-(1-naphthyl)-1,2-epoxypropane | 2-amino-3-acetoxypyridine | 3-(1-naphthyl)-1-(2-imino-3-acetoxy-1,2-dihydro-1-pyridyl)-2-propanol |
| 3-(1-naphthyl)-1,2-expoxypropane | 2-amino-3-acetamidopyridine | 3-(1-naphthyl)-1-(2-imino-3-acetamido-1,2-dihydro-1-pyridyl)-2-propanol |
| 3-(1-naphthyl)-1,2-epoxypropane | 2-amino-3-nitropyridine | 3-(1-naphthyl)-1-(2-imino-3-nitro-1,2-dihydro-1-pyridyl)-2-propanol |
| 3-(1-naphthyl)-1,2-epoxypropane | 2-amino-4,6-dimethylpyridine | 3-(1-naphthyl)-1-(2-imino-4,6-dimethyl-1,2-dihydro-1-pyridyl)-2-propanol |
| 3-(1-naphthyl)-1,2-epoxypropane | 2-amino-3,5-dichloropyridine | 3-(1-naphthyl)-1-(2-imino-3,5-dichloro-1,2-dihydro-1-pyridyl)-2-propanol |
| 3-(1-naphthyl)-1,2-epoxypropane | 2-amino-3-hydroxypyridine | 3-(1-naphthyl)-1-(2-imino-3-hydroxy-1,2-dihydro-1-pyridyl)-2-propanol |
| 3-(1-naphthyl)-1,2-epoxypropane | 2-amino-3-methoxypyridine | 3-(1-naphthyl)-1-(2-imino-3-methoxy-1,2-dihydro-1-pyridyl)-2-propanol |
| 3-(1-naphthyl)-1,2-epoxypropane | 2,6-diaminopyridine | 3-(1-naphthyl)-1-(2-imino-6-amino-1,2-dihydro-1-pyridyl)-2-propanol |
| 3-(1-naphthyl)-1,2-epoxypropane | 2-amino-3-hydroxymethylpyridine | 3-(1-naphthyl)-1-(2-imino-3-hydroxymethyl-1,2-dihydro-1-pyridyl)-2-propanol |
| 3-(1-naphthyl)-1,2-epoxypropane | 2-allylaminopyridine | 3-(1-naphthyl)-1-(2-allylimino-1,2-dihydro-1-pyridyl)-2-propanol |
| 3-(1-naphthyl)-1,2-epoxypropane | 2-phenylaminopyridine | 3-(1-naphthyl)-1-(2-phenylimino-1,2-dihydro-1-pyridyl)-2-propanol |
| 3-(1-naphthyl)-1,2-epoxypropane | 2-benzylaminopyridine | 3-(1-naphthyl)-1-(2-benzylimino-1,2-dihydro-1-pyridyl)-2-propanol |
| 3-(1-naphthyl)-1,2-epoxypropane | 2-cyclohexylaminopyridine | 3-(1-naphthyl)-1-(2-cyclohexylimino-1,2-dihydro-1-pyridyl)-2-propanol |
| 3-(2-phenylphenyl)-1,2-epoxypropane | 2-aminopyridine | 3-(2-phenylphenyl)-1-(2-imino-1,2-dihydro-1-pyridyl)-2-propanol |
| 3-(1-naphthyl)-1,2-epoxypropane | 3-ethoxy-2-aminopyridine | 3-(1-naphthyl)-1-(2-imino-3-ethoxy-1,2-dihydro-1-pyridyl)-2-propanol |

We claim:
1. A compound having the structural formula:

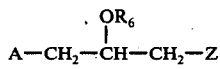

wherein:
A is an aromatic radical selected from the group consisting of:
(a) substituted phenyl groups having the formula:

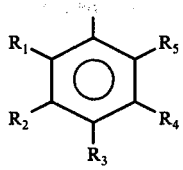

wherein $R_1$, $R_2$, $R_3$, $R_4$, and $R_5$, which may be the same or different are substituents selected from the group consisting of:
hydrogen,
alkyl,
alkenyl,
alkynyl,
cycloalkyl,
phenyl,
alkoxy,
halo,
hydroxy,
hydroxymethyl,
amino,
acyloxy,
acylamino,
acylalkylamino,
dialkylamino,
trifluoromethyl,
nitro,
cyano,
acyl,
formyl,
carboxy,
alkoxycarbonyl,
carbamoyl,
alkylsulfonyl,
alkoxyalkyl,
carboxyalkyl,
carbamoylalkyl,
alkoxyalkoxy, provided that at least one of $R_1$, $R_2$, $R_3$, $R_4$, and $R_5$ must be hydrogen, no more than 4 may be loweralkyl, no more than three may be loweralkoxy, no more than 2 may be halogen, and no more than one may be any of the other substituents; and the total carbon content of all the substituents must not exceed 6 carbon atoms;

(b) naphthyl and naphthyl substituted with no more than two alkyl groups and no more than one other substituent selected from the group consisting of
halo,
alkoxy,
nitro,
aminosulfonyl,
acylamino,
provided that the total carbon content of all the substituents must not exceed 4 carbon atoms;

(c) polycyclic carbocyclic radicals selected from the group consisting of
indenyl,
indanyl,
5,6,7,8-tetrahydronaphthyl,
6,7,8,9-tetrahydro-5H-benzocycloheptenyl,
5,6,7,8,9,10-hexahydrobenzocyclooctenyl,
5,6,7,8-tetrahydro-5,8-methano-1-naphthyl
5,6,7,8-tetrahydro-5,8-ethano-1-naphthyl, (d) bicyclic heterocyclic radicals selected from the group consisting of
4-benzofuranyl,
7-benzofuranyl,
2-acetyl-7-benzofuranyl,
4-benzothienyl,
7-benzothienyl,
8-thiochromanyl,
5-quinolyl,
5-isoquinolyl;

Z is an iminopyridyl radical having the structural formula

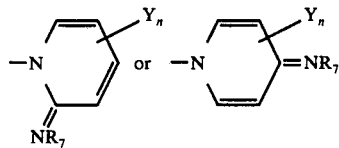

wherein:
Y is selected from the group consisting of
hydrogen,
loweralkyl,
loweralkenyl,
loweralkoxy,
loweralkoxycarbonyl,
loweracyloxy,
loweracylamino,
carbamoyl,
cyano,
halo,
and $n = 1$ or 2 when Y is loweralkyl or halo,
and $n = 1$ in all other cases;
$R_6$ is selected from the group consisting of hydrogen,
loweralkoxycarbonyl,
loweracyl,
carboxyloweracyl,
carbamoyl,
thiocarbamoyl and
$R_7$ is selected from the group consisting of
hydrogen,
loweralkyl,
loweralkenyl,
loweralkynyl,
$C_3$-$C_6$ cycloalkyl,
$C_4$-$C_8$ cycloalkylalkyl,
phenyl,
benzyl,
phenylethyl,
loweralkoxycarbonyl,
loweracyl,
carboxyloweracyl,
carbamoyl,
thiocarbamoyl;
and pharmaceutically acceptable acid addition salts.

2. A compound according to claim 1 wherein A is selected from the group consisting of
(a) substituted phenyl groups having the formula

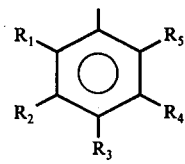

wherein $R_1$, $R_2$, $R_3$, $R_4$, and $R_5$ are selected from the group consisting of
hydrogen,
alkyl,
alkenyl,
alkynyl,
cycloalkyl,
phenyl,
alkoxy,
halo,
acyloxy,
acylamino,
acylalkylamino,
dialkylamino,
trifluoromethyl,
acyl,
alkoxycarbonyl,
carbamoyl,
alkoxyalkyl,
carbamoylalkyl,
alkoxyalkoxy;
(b) naphthyl and naphthyl substituted with no more than two alkyl groups and no more than one other substituent selected from the group consisting of halo and alkoxy; and
(c) polycyclic carbocyclic radicals selected from the group consisting of indanyl and 5,6,7,8-tetrahydronaphthyl.

3. A compound according to claim 1 wherein A is selected from the group consisting of:
2-ethylphenyl,
2-allylphenyl,
2-methoxyphenyl,
2-methyl-3-methoxyphenyl,
1-naphthyl,
5-indanyl, and
4-indanyl.

4. A compound according to claim 1 wherein A is 1-naphthyl.

5. A compound according to claim 1, wherein Y is selected from the group consisting of:
hydrogen,
loweralkyl,
loweralkenyl,
loweralkoxy,
alkoxycarbonyl,
loweracyl,
loweracyloxy, and
halo.

6. A compound according to claim 1 wherein $R_6$ is selected from the group consisting of:
hydrogen,
methoxycarbonyl,
propionyl,
benzoyl, and
3-carboxypropionyl.

7. A compound according to claim 1 wherein $R_7$ is selected from the group consisting of:
hydrogen,
methyl,
methoxycarbonyl,
propionyl,
benzoyl, and
3-carboxypropionyl.

8. A compound according to claim 1 wherein Z is a 2-imino-1,2-dihydropyridyl group of the formula

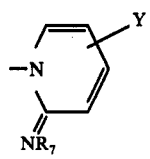

wherein Y is selected from group consisting of hydrogen and methyl and $R_7$ is selected from the group consisting of hydrogen, methyl, methoxycarbonyl, and 3-carboxypropionyl.

9. A compound according to claim 1 wherein said pharmaceutically acceptable acid addition salts are selected from the group consisting of hydrochlorides, hydrobromides, acetic acid salts, benzoic acid salts, and p-toluenesulfonic acid salts.

10. A compound according to claim 2 wherein Y is selected from the group consisting of hydrogen, loweralkyl, loweralkoxy, and halo; and $R_6$ and $R_7$ are selected from the group consisting of hydrogen, loweralkoxycarbonyl, and loweracyl.

11. A compound according to claim 3 wherein Z is a 2-imino-1,2-dihydropyridyl group of the formula

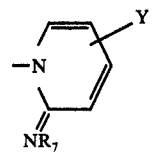

wherein Y is selected from the group consisting of hydrogen and methyl,
$R_6$ is selected from the group consisting of
hydrogen,
methoxycarbonyl,
propionyl;
and $R_7$ is selected from the group consisting of
hydrogen,
methoxycarbonyl,
propionyl.

12. 3-(1-Naphthyl)-1-(2-imino-1,2-dihydro-1-pyridyl)-2-propanol and pharmaceutically acceptable acid addition salts.

13. 3-(1-Naphthyl)-1-(2-imino-1,2-dihydro-3-methyl-1-pyridyl)-2-propanol and pharmaceutically acceptable acid addition salts.

14. 3-(1-Naphthyl)-1-(2-imino-1,2-dihydro-4-methyl-1-pyridyl)-2-propanol and pharmaceutically acceptable acid addition salts.

15. 3-(1-Naphthyl)-1-(2-imino-3-hydroxy-1,2-dihydro-1-pyridyl)-2-propanol and pharmaceutically acceptable acid addition salts.

16. 3-(1-Naphthyl)-1-(2-imino-3-ethoxy-1,2-dihydro-1-pyridyl)-2-propanol and pharmacetucially acceptable acid addition salts.

* * * * *